US010592103B2

(12) United States Patent
Choi et al.

(10) Patent No.: US 10,592,103 B2
(45) Date of Patent: Mar. 17, 2020

(54) MOBILE TERMINAL AND METHOD FOR CONTROLLING THE SAME

(71) Applicant: LG ELECTRONICS INC., Seoul (KR)

(72) Inventors: Younhwa Choi, Seoul (KR); Huran Choi, Seoul (KR)

(73) Assignee: LG ELECTRONICS INC., Seoul (KR)

(*) Notice: Subject to any disclaimer, the term of this patent is extended or adjusted under 35 U.S.C. 154(b) by 67 days.

(21) Appl. No.: 15/670,861

(22) Filed: Aug. 7, 2017

(65) Prior Publication Data

US 2018/0143761 A1 May 24, 2018

(30) Foreign Application Priority Data

Nov. 22, 2016 (KR) .................. 10-2016-0155902

(51) Int. Cl.
*G06F 3/14* (2006.01)
*G06F 3/0488* (2013.01)
*H04M 1/725* (2006.01)
*G06F 3/0482* (2013.01)
*G06K 9/00* (2006.01)
*H04L 12/58* (2006.01)

(52) U.S. Cl.
CPC ........ *G06F 3/04886* (2013.01); *G06F 3/0482* (2013.01); *G06F 3/0488* (2013.01); *G06K 9/00302* (2013.01); *H04M 1/72544* (2013.01); *H04M 1/72552* (2013.01); *H04M 1/72555* (2013.01); *H04L 51/38* (2013.01)

(58) Field of Classification Search
None
See application file for complete search history.

(56) References Cited

U.S. PATENT DOCUMENTS

2004/0179037 A1* 9/2004 Blattner .................. G06T 13/40
715/751
2006/0041848 A1* 2/2006 Lira ..................... G06Q 10/107
715/805
(Continued)

FOREIGN PATENT DOCUMENTS

EP 1523160 4/2005
EP 1549031 6/2005

OTHER PUBLICATIONS

Abhijit R. Joshi et al., Analysis and Detection of Eventful Messages in Instant Messengers, Mar. 1, 2016, IEEE, pp. 2503-2507 (Year: 2016).*
(Continued)

*Primary Examiner* — Tam T Tran
(74) *Attorney, Agent, or Firm* — Lee, Hong, Degerman, Kang & Waimey

(57) ABSTRACT

Disclosed are a mobile terminal and a method for controlling the same. A mobile terminal includes a wireless communication unit mounted in a main body to transmit/receive a message, a display unit for displaying the transmitted/received message on a message-based screen, and a controller for, if an element representing an predefined content is detected from the displayed message, creating a moving image which is associated to the predefined content, and providing the created moving image together with the message, wherein the moving image is created based on an image shared on the message-based screen.

20 Claims, 15 Drawing Sheets

(56) References Cited

U.S. PATENT DOCUMENTS

| | | | |
|---|---|---|---|
| 2012/0059787 A1* | 3/2012 | Brown | G06F 17/241 706/52 |
| 2012/0106917 A1* | 5/2012 | Momosaki | H04N 5/765 386/230 |
| 2013/0147933 A1 | 6/2013 | Kulas | |
| 2013/0159919 A1* | 6/2013 | Leydon | G06F 3/0236 715/780 |
| 2014/0118595 A1* | 5/2014 | Jung | H04N 5/23293 348/333.01 |
| 2014/0157153 A1* | 6/2014 | Yuen | A63F 13/537 715/758 |
| 2014/0161356 A1 | 6/2014 | Tesch et al. | |
| 2014/0192134 A1* | 7/2014 | Jung | G06K 9/00255 348/14.02 |
| 2015/0334075 A1* | 11/2015 | Wang | G07C 13/00 715/752 |
| 2016/0004413 A1 | 1/2016 | Leydon et al. | |
| 2016/0035123 A1 | 2/2016 | Bonansea | |
| 2016/0127504 A1* | 5/2016 | Takahashi | H04L 67/34 709/219 |
| 2016/0180560 A1 | 6/2016 | Patel et al. | |
| 2016/0330327 A1 | 11/2016 | Lee et al. | |
| 2016/0359777 A1* | 12/2016 | Tucker | H04L 51/10 |
| 2018/0068475 A1* | 3/2018 | Blue | G06T 11/60 |

OTHER PUBLICATIONS

Shradha U. Patel et al., Emotions Reflecting Chat Application, Mar. 1, 2012, IEEE International Conference on Advances in Engineering), pp. 479-483 (Year: 2012).*

European Patent Office Application Serial No. 17183306.4, Search Report dated Jan. 16, 2018, 17 pages.

European Patent Office Application Serial No. 17183306.4, Search Report dated Apr. 19, 2018, 17 pages.

European Patent Office Application Serial No. 17183306.4, Communication Pursuant to Article 94(3) dated Mar. 21, 2019, 7 pages.

* cited by examiner

MOBILE TERMINAL AND METHOD FOR CONTROLLING THE SAME

CROSS-REFERENCE TO RELATED APPLICATIONS

Pursuant to 35 U.S.C. § 119(a), this application claims the benefit of earlier filing date and right of priority to Korean Application No. 10-2016-0155902, filed on Nov. 22, 2016, the contents of which are all hereby incorporated by reference herein in its entirety.

BACKGROUND OF THE INVENTION

1. Field of the Invention

The present disclosure relates to a mobile terminal having a display unit on which a message based conversation is displayed and a method for controlling the mobile terminal.

2. Description of the Conventional Art

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

In addition, a conversation with a specific person or a plurality of persons can be performed using a message-based conversation in such a terminal. Recently, as desires of a user using the terminal to express emotions increase, the use of various character emoticons has increased.

To this end, character emoticons to which various emotional expressions are reflected are provided in a story fashion. However, since everyone can use such character emoticons, there is a limitation in delivering more detailed emotional expressions, and users should continuously purchase the character emoticons. In addition, operations such as web search, edition, and file conversion should be performed such that an image or moving picture published on a web is used as a means for delivering an emotional expression, which is inconvenient. In addition, a conversation is stopped due to the operations.

SUMMARY OF THE INVENTION

Therefore, an aspect of the detailed description is to provide a mobile terminal capable of creating a GIF image for only a user, which can deliver an immediate emotional expression while seamlessly maintaining a message-based conversation, and a method for controlling the mobile terminal.

Another aspect of the detailed description is to provide a mobile terminal capable of providing a moving image that delivers an emotional expression suitable for a conversation content, without executing a separate application or performing a user manipulation, and a method for controlling the mobile terminal.

To achieve these and other advantages and in accordance with the purpose of this specification, as embodied and broadly described herein, a mobile terminal includes: a main body; a wireless communication unit mounted in the main body to transmit/receive a message; a display unit configured to display the transmitted/received message on a message-based screen; and a controller configured to, if an element representing an emotional state is detected from the displayed message, create a moving image which is associated to the predefined content, and provide the created moving image together with the message, wherein the moving image is created based on an image shared on the message-based screen.

Further scope of applicability of the present application will become more apparent from the detailed description given hereinafter. However, it should be understood that the detailed description and specific examples, while indicating exemplary embodiments of the invention, are given by way of illustration only, since various changes and modifications within the spirit and scope of the invention will become apparent to those skilled in the art from the detailed description.

BRIEF DESCRIPTION OF THE DRAWING

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF EXEMPLARY EMBODIMENTS

Description will now be given in detail of the exemplary embodiments, with reference to the accompanying drawings. For the sake of brief description with reference to the drawings, the same or equivalent components will be provided with the same reference numbers, and description thereof will not be repeated. A suffix "module" or "unit" used for constituent elements disclosed in the following description is merely intended for easy description of the specification, and the suffix itself does not give any special meaning or function. In describing the present invention, if a detailed explanation for a related known function or construction is considered to unnecessarily divert the gist of the present disclosure, such explanation has been omitted but would be understood by those skilled in the art. The accompanying drawings are used to help easily understood the technical idea of the present invention and it should be understood that the idea of the present disclosure is not limited by the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart glasses), head mounted displays (HMDs), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and a digital signage.

Figure 1A:
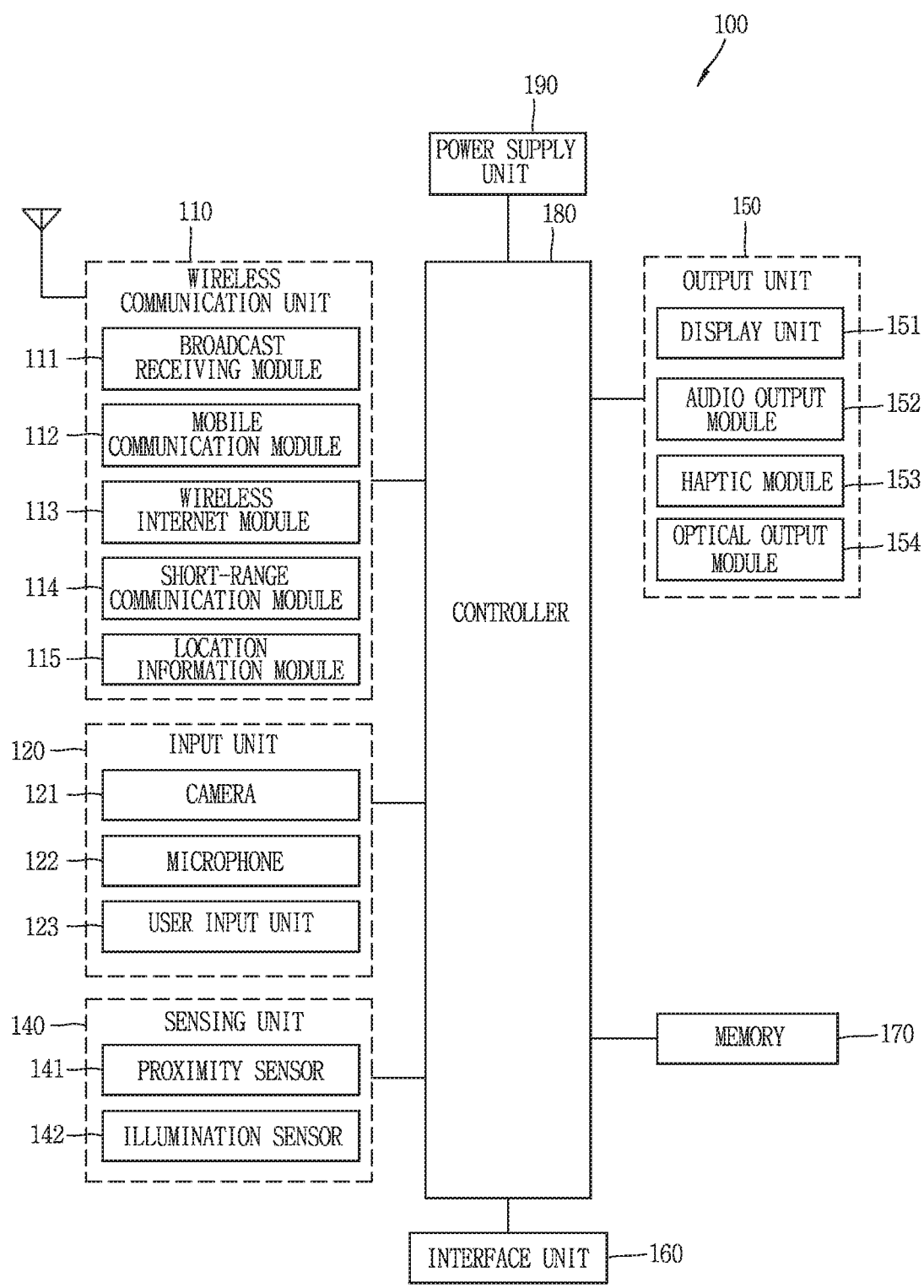
FIG. 1A is a block diagram of a mobile terminal according to an exemplary embodiment.
Figure 1B:
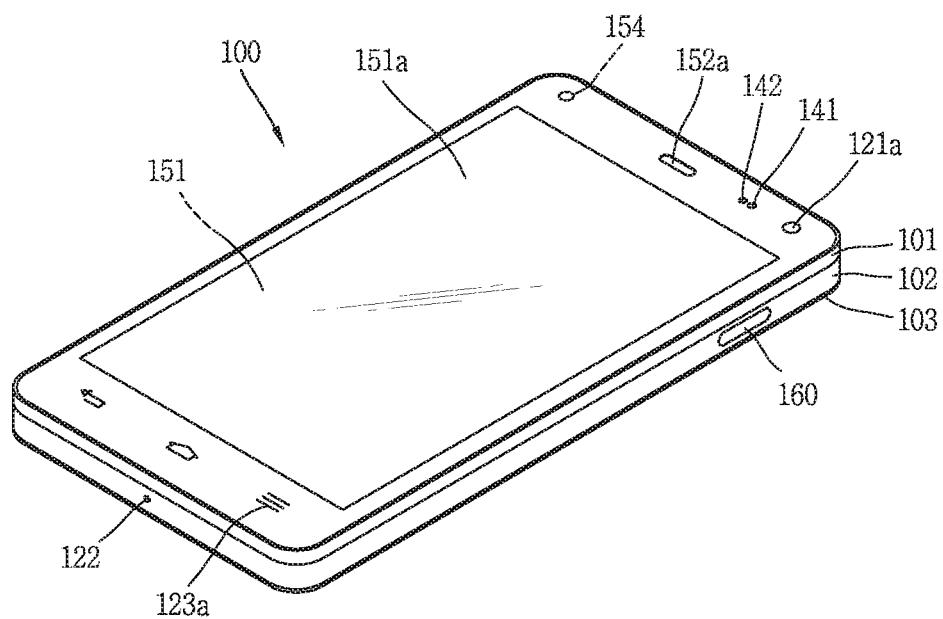
FIGS. 1B and 1C are conceptual diagrams illustrating an example of the mobile terminal, viewed in different directions, according to the exemplary embodiment.
Figure 10:
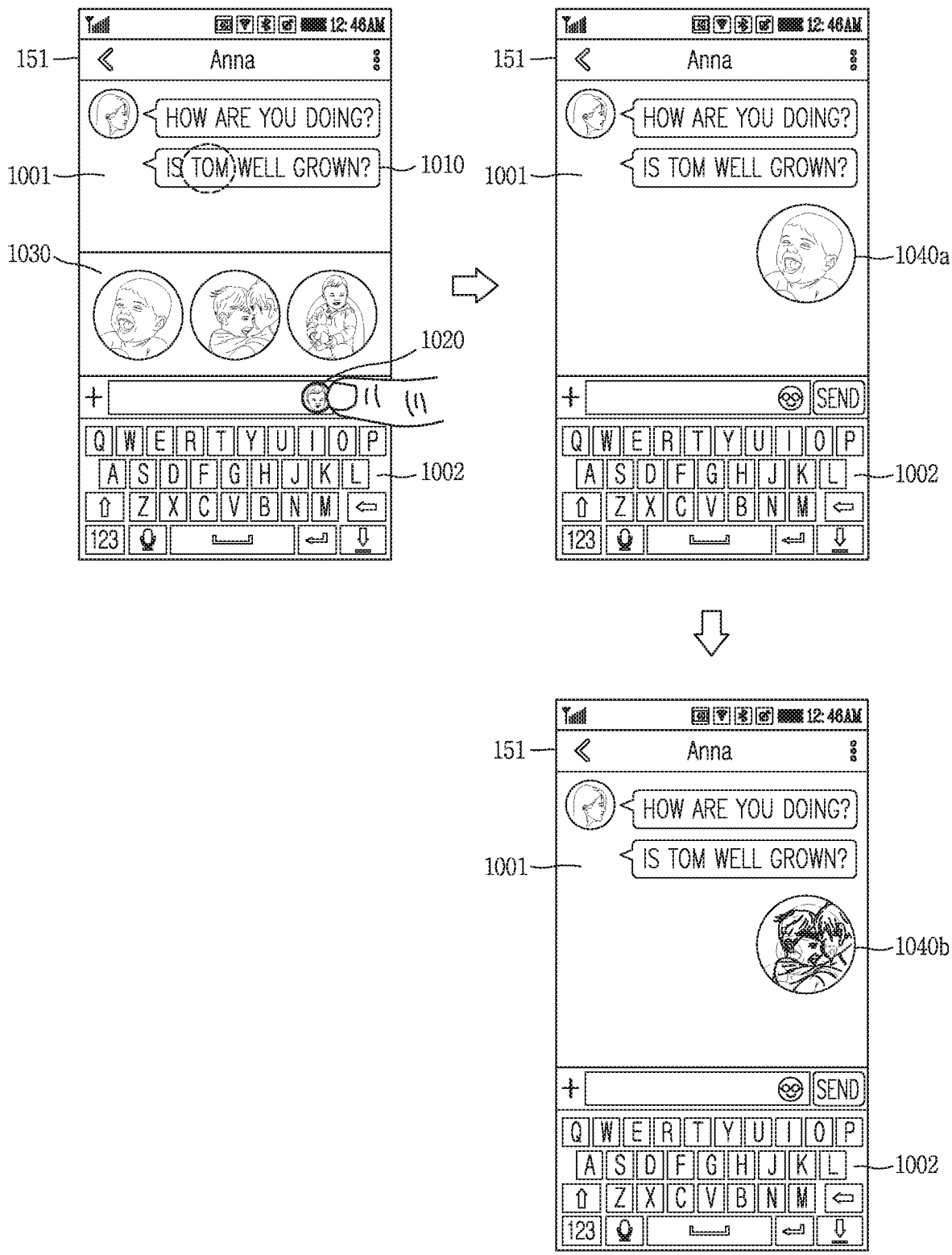

FIG. 1A is a block diagram illustrating a mobile terminal according to one embodiment of the present invention, and FIGS. 1B and 10 are perspective views of one example of a mobile terminal according to one embodiment, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

The mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1, or activating application programs stored in the memory 170. As one example, the controller 180 controls some or all of the components according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the components may operate in cooperation with one another in order to implement an operation, control or control method of the mobile terminal according to various exemplary embodiments to be described below. The operation, control or control method of the mobile terminal may be implemented on the mobile terminal by the execution of at least one application program stored in the memory 170.

Hereinafter, the aforementioned components will be explained in more detail with reference to FIG. 1A, before various embodiments are explained.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to the mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor.

Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Figure 1C:
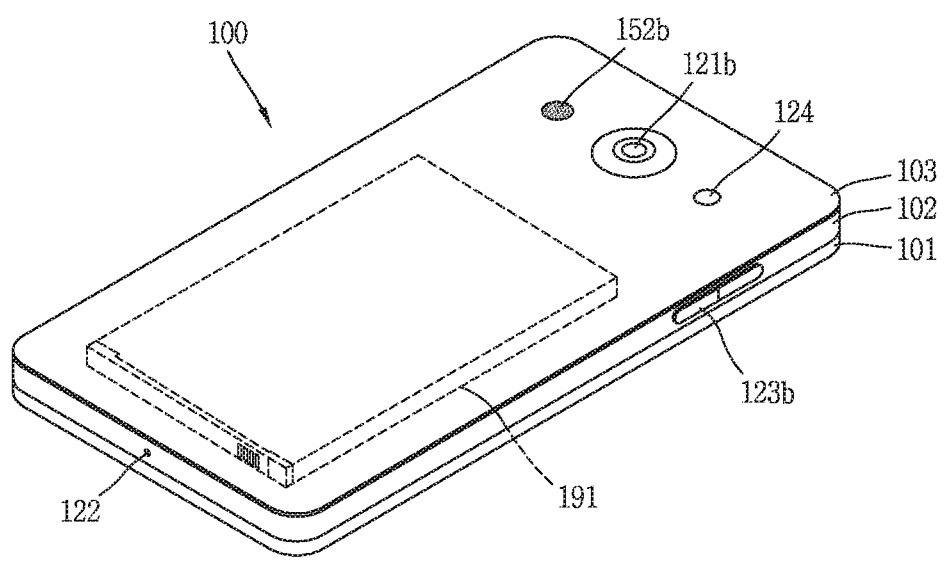

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The display unit 151, the first audio output module 152a, the second audio output module 152b, the proximity sensor 141, the illumination sensor 142, the optical output module 154, a first camera 121a, a second camera 121b, the first manipulation unit 123a, the second manipulation unit 123b, the microphone 122, the interface 160, etc. may be provided at the mobile terminal 100.

As shown in FIGS. 1B and 10, the display unit 151, the first audio output module 152a, the proximity sensor 141, the illumination sensor 142, the optical output module 154, the first camera 121a and the first manipulation unit 123a are arranged on a front surface of the terminal body. The second manipulation unit 123b, the microphone 122 and the interface 160 are arranged on side surfaces of the terminal body. And the second audio output module 152b and the second camera 121b are arranged on a rear surface of the terminal body.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable mobile terminals. Examples of such suitable mobile terminals include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two mobile terminals, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1). Therefore, the touch screen may replace at least some of the functions of the first manipulation unit 123a.

The first audio output module 152a may be implemented in the form of a receiver, and the second audio output module 152b may be implemented in the form of a loud speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output. The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may be implemented in a user's non-tactile manner, e.g., by a proximity touch, a hovering touch, etc.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

A flash 124 is shown adjacent to the second camera 121b. When an image of a subject is captured with the camera 121b, the flash 124 may illuminate the subject.

The second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 (refer to FIG. 1A) may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

The wireless communication unit 110 of the mobile terminal 100 according to the exemplary embodiment described above may receive information such as a message or image from at least one another terminal, and the received information such as the message or image may be output on a message-based conversation screen of the display unit 151. In this case, if an element representing an emotional state is detected in the displayed message, the controller 180 may automatically generate a moving GIF image representing the corresponding emotional state. In addition, the controller 180 may provide the generated GIF image together with a corresponding message.

Here, the GIF image refers to a moving animation image stored with a GIF extension. The GIF image is different from a general moving picture in that a moving image is automatically continuously reproduced without the need to manipulate a reproduction button, etc.

In the present disclosure, the GIF image is generated based on an image shared on a message-based screen. That is, images stored with the GIF extension are not used in a web browser or the mobile terminal 100, and GIF images are generated in real time, based on images transmitted and received on the message-based screen. Accordingly, more immediate emotions can be delivered during the performance of a message-based conversation, and maximized emotional expression and excitement can be provided. Hereinafter, specific exemplary embodiments in which a moving GIF image is generated based on an image shared on a message-based screen will be described.

Figure 2:
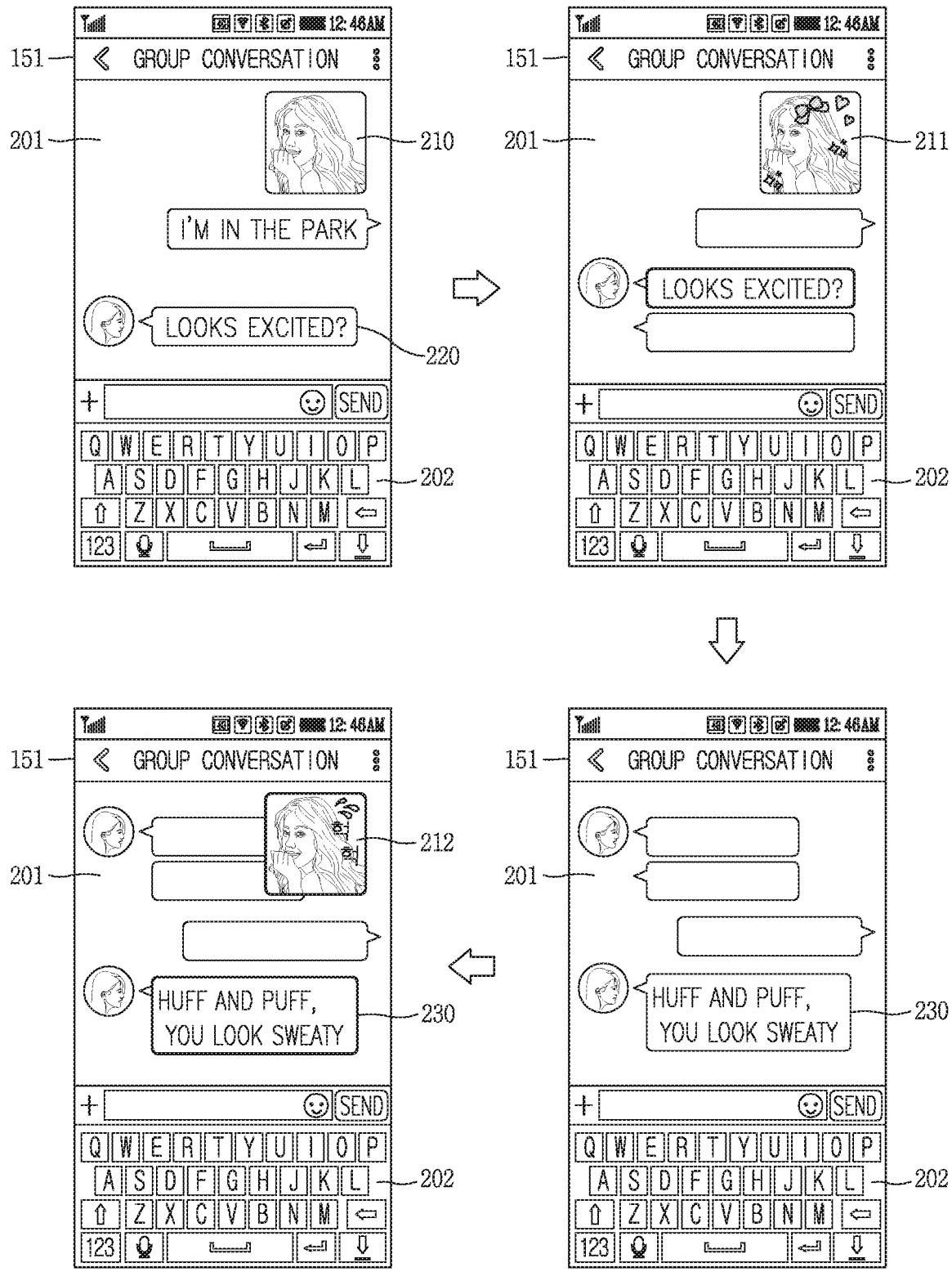
FIG. 2 shows representative conceptual diagrams illustrating an operation implemented in the mobile terminal according to the exemplary embodiment.

FIG. 2 shows representative conceptual diagrams illustrating an operation implemented in the mobile terminal according to the exemplary embodiment.

Referring to FIG. 2, first, a conversation screen 201 corresponding to the execution of a message application for performing a message-based conversation with the other party may be displayed on the display unit 151 of the mobile terminal 100.

A user may transmit a specific image 210 stored in its own terminal or searched through a web browser or the like to share the specific image 210 with the other party who is having a conversation with the user. While the specific image 210 is being displayed on the conversation screen 210, the other party may create and transmit a message 220 having a content relate to the corresponding image 210.

For example, if a content called 'looks excited' is transmitted as a message 220 expressing a feeling of the other party with respect to the displayed image 210, the mobile terminal 100 may display the received message 220 and then output, to the corresponding message, an expression notifying that an element representing an emotional state has been detected. As an example, any one of a size enlargement, a color change, and a highlighting effect, which are distinguished from other messages, may be applied to the corresponding message.

Here, the element representing an emotional state is an expression element that delivers a feeling of the other party with respect to a specific image or a plurality of images, and may include an ellipsis ( . . . ) and the like, in addition to a sentence, a text, and a boilerplate. In addition, the transmission of a message has been exemplified as an expression element for delivering a feeling of the third party. However, the present disclosure is not limited thereto, and the expression element may include various emotional expressions, e.g., the transmission of an image and the input of a specific gesture such as a tap.

If the element representing an emotional state is detected in the received message 220 as described above, the controller 180 creates a moving GIF image 211 representing the corresponding emotional state on the basis of the shared image 210. Specifically, as shown in FIG. 2, the controller 180 may create a moving GIF image 211 representing the corresponding emotional state (e.g., 'excitement') by synthesizing a moving background image or moving object, e.g., an animation image in which a plurality of heart images are flown, on the shared image 210.

The GIF image created as described above may be continuously reproduced for a preset time or while the corresponding message is being displayed on the screen. In addition, the created GIF image, as shown in FIG. 2, may disappear while being scrolled in a specific direction (e.g., upward) as the number of messages transmitted and received on the screen increases. Alternatively, as an example, the created GIF image 211 may be naturally returned to the original image 210 as the preset time elapses.

Continuously, a second message 230 related to the corresponding image 211 may be received on the message-based screen 201.

When an element expressing a feeling of the speaker, e.g., a text such as 'You looks sweaty ~' is included in the received second message 230, the controller 180 may create a new GIF image 212 representing an emotional state included in the second image 230 by calling the corresponding image 211 that has been scrolled. Specifically, as shown in FIG. 2, an animation image representing a typographic effect (e.g., huff and puff) while drops of sweat are falling may be synthesized on the original image 210.

To this end, the image 211 that has been scrolled may be popped up in a window shape in a predetermined area of the display 151, e.g., at a right top end of the message-based screen 201. Simultaneously, an expression visually distinguished from other messages, e.g., a highlighting effect may be output to the corresponding second message 230.

Meanwhile, in FIG. 2, the moving GIF image may be implemented to be provided in an input area for creating a message, e.g., only while a virtual keyboard 202 is being displayed. Specifically, the controller 180 may determine that the message-based conversation is to be continued while the virtual keyboard 202 is being displayed. Only when it is determined that the message-based conversation is to be continued while the virtual keyboard 202 is being displayed, the controller 180 may provide a GIF image for the delivery of an immediate emotion and the maximization of an emotional expression. In this case, if the virtual keyboard 201 disappears from the display unit 151, the GIF images 211 and 212 may be automatically returned to the original image 210.

In FIG. 2, the case where a moving GIF image is created based on a received message has been described as an example, but a moving GIF image may be created based on the content of a transmitted message or a message being created. A specific embodiment related to this will be described in more detail below.

In FIG. 2, the case where a GIF image is created by synthesizing a moving background image on the basis of one shared image 210 has been described as an example, but one GIF image may be created based on a plurality of shared images. Alternatively, when a plurality of images are transmitted at the same time, a GIF image may be created based on one specific image or one image shared at the last in a message.

As described above, in the present disclosure, a GIF image moving based on the content of a message-based conversation can be immediately created and provided without searching a web browser or executing a separate application. In addition, a shared image is changed to a GIF image, so that it is possible to provide the delivery of a more immediate emotion and the maximization of an emotional expression.

Figure 3:
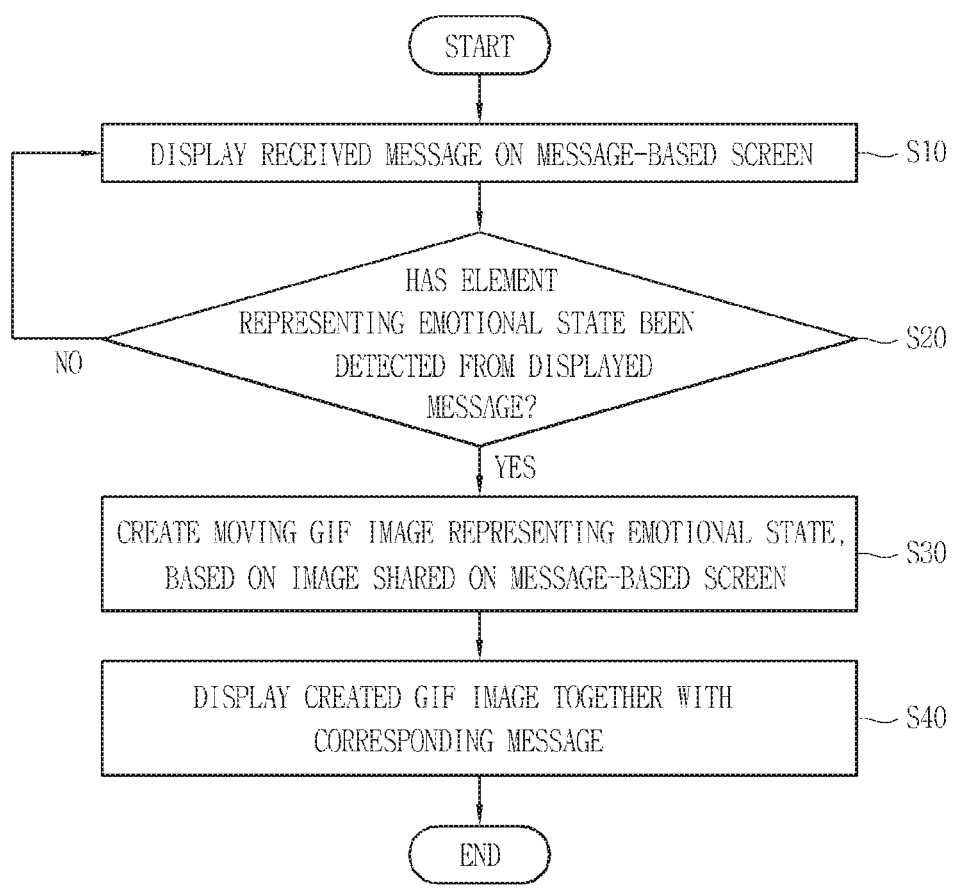
FIG. 3 is a representative flowchart illustrating an operation implemented in the mobile terminal according to the exemplary embodiment.

FIG. 3 is a representative flowchart illustrating an operation implemented in the mobile terminal according to the exemplary embodiment.

Referring to FIG. 3, first, if a message is transmitted or received through the wireless communication unit 110 of the mobile terminal 100, the transmitted or received message is displayed on a message-based screen (S10). Here, the message-based screen may be a single conversation screen with a specific person or a conversation screen of a group chatting room.

Next, when an element representing an emotional state is detected from the displayed message (S20), the controller 180 of the mobile terminal 100 may immediately create a moving GIF image representing the corresponding emotional state, based on an image shared on the message-based screen (S30).

Here, the element representing an emotional state may include not only an expressional element that delivers a feeling of a person with respect to a shared image but also various sentences, texts, images, symbols, and the like, which represent a current emotional state of the person or a situation that the person encounters. Further, the element representing an emotional state may also include elements of the emotional state that can be analogized through a conversation context. For example, when a response message called 'You don't need to come^^' is transmitted with respect to an emotional state that can be analogized through a conversation context such as the content of a message, e.g., a response message called 'I'll be late, and also tomorrow', in addition to a directional emotional expression such as 'tired,' 'love you,' sleepy,' or 'irritated,' it may be presumed that an element representing an emotional state of irritation is included on a context.

Since expression modes representing emotional states are different for every person, the controller 180 may continuously learn linguistic habits of a user to detect an element representing an emotional state, and apply the learned information to the creation of a GIF image so as to more accurately analyze an emotional state included in a message.

That a moving GIF image is created based on an image shared on a message-based screen may mean that a GIF image is created by synthesizing a 'moving object' with an image that has most recently shared or images that were shared in the past on the corresponding message-based screen. Here, the moving object may include all kinds of image objects that provide animation effects as if they moved, for example, as a background image, a typography (e.g., top), a decoration (e.g., star/heart/snow/flower), a hand sign (e.g., OK/fist/V), other objects (e.g., glasses/cap/ring, etc.), or the like repetitively appears and disappears around the shared image or as a plurality of images located at different positions are connected to be reproduced on the shared image.

Alternatively, that a moving GIF image is created based on an image shared on a message-based screen may mean that a GIF image that is repetitively reproduced at a specific speed is created by simply connecting a plurality of images transmitted and received on the corresponding message-based screen.

The controller 180 creates a moving GIF image such that an emotional state detected from a specific message is revealed. For example, when the emotional state detected from the message is an 'emotional state of angry,' the controller 180 may create a GIF image by synthesizing a moving background image or objects representing an angry emotion. In addition, when the image shared on the message-based screen includes a facial area, the controller 180 may create a moving GIF image by extracting a facial area from the shared image and then setting a face with an angry expression in the extracted facial area.

Next, the GIF image created as described above may be provided together with the corresponding message on the message-based screen (S40). That is, the GIF image is displayed together with a conversation content on the message-based screen, so that it is possible to deliver a more exciting and immediate emotional expression.

Figure 4:
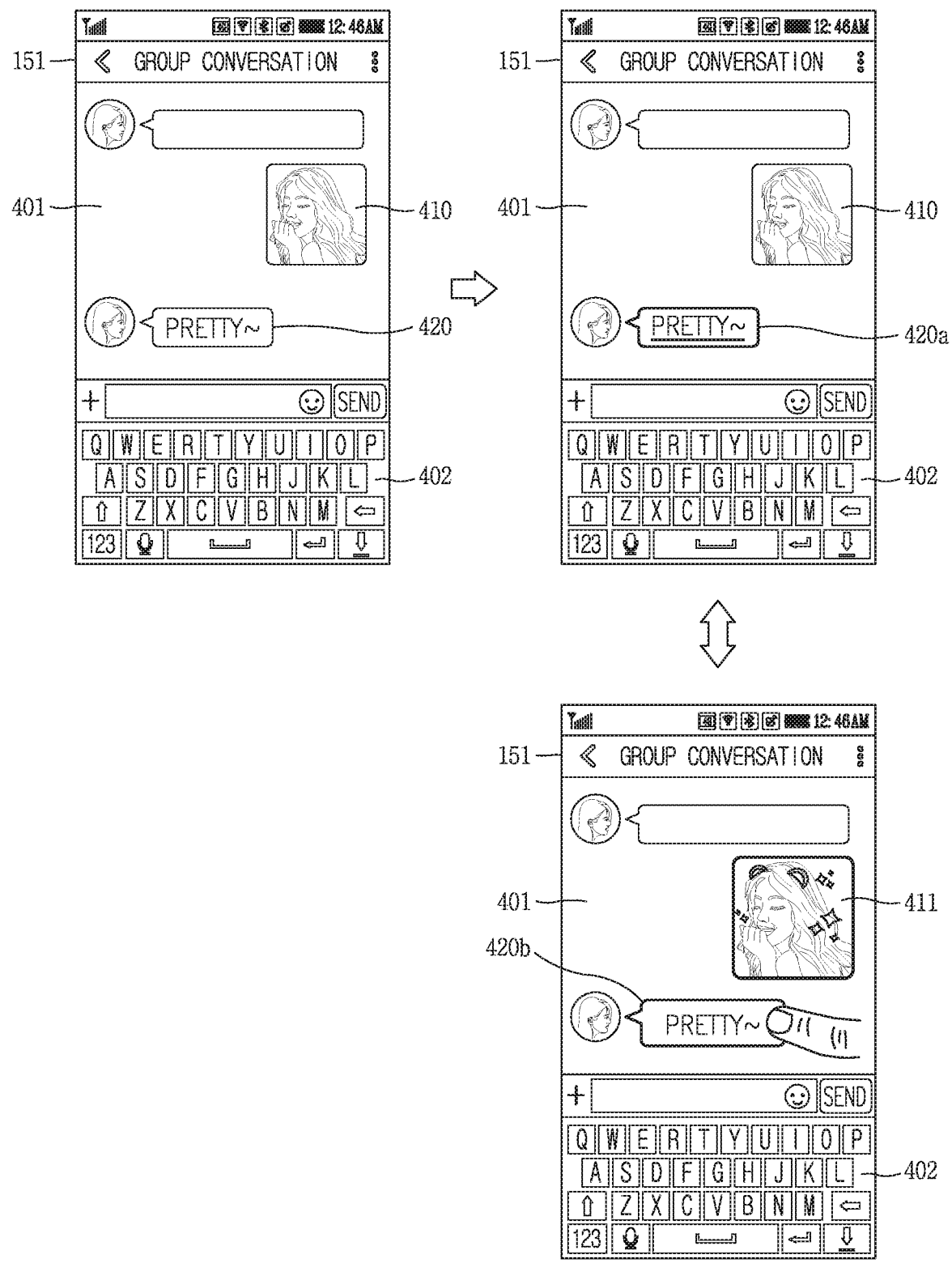
FIGS. 4, 5, and 6 are conceptual diagrams illustrating various examples of a method for displaying a created GIF image using a still image or moving picture displayed on a current conversation screen in the mobile terminal according to the exemplary embodiment.
Figure 5:
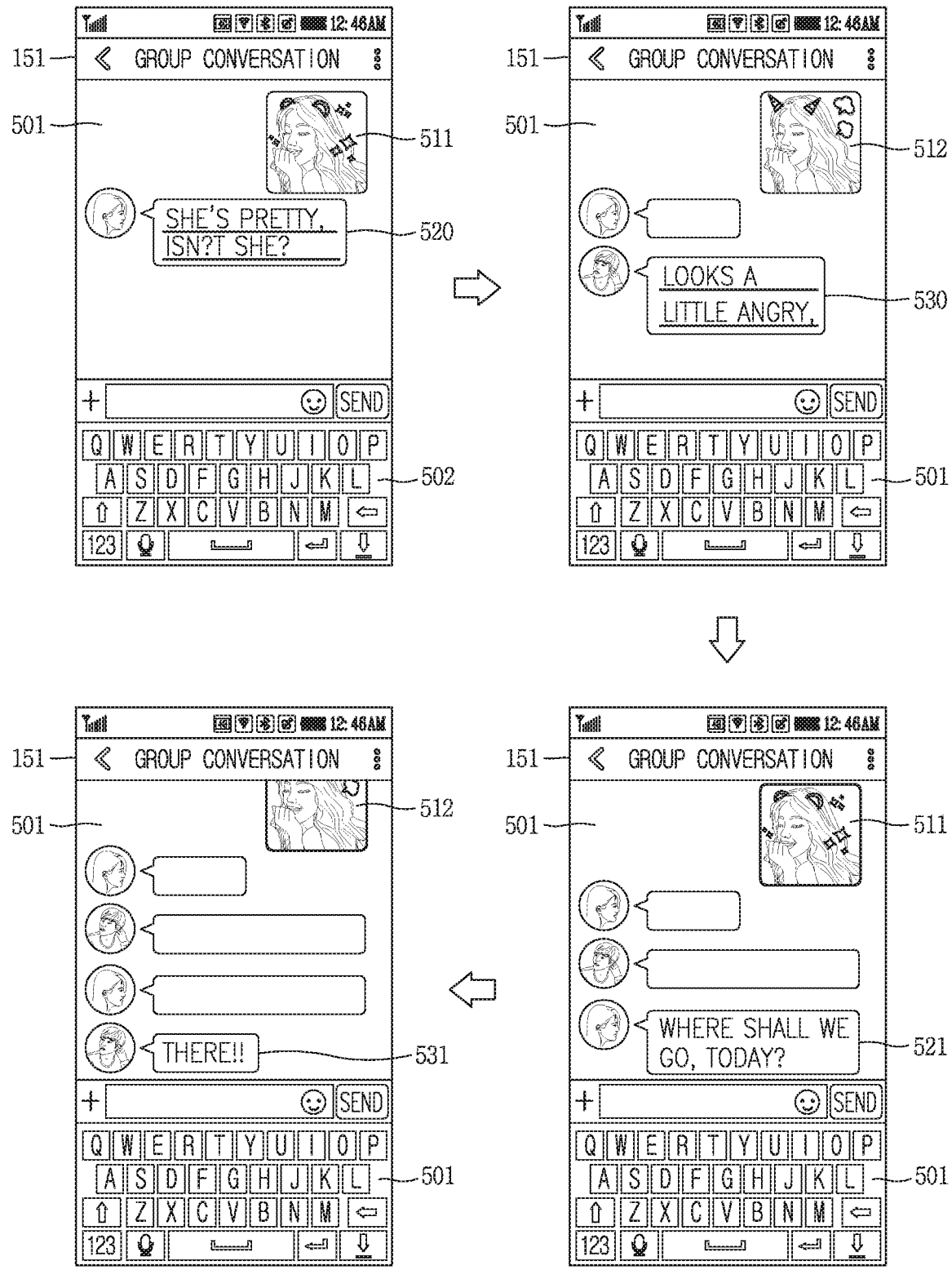
Figure 6:
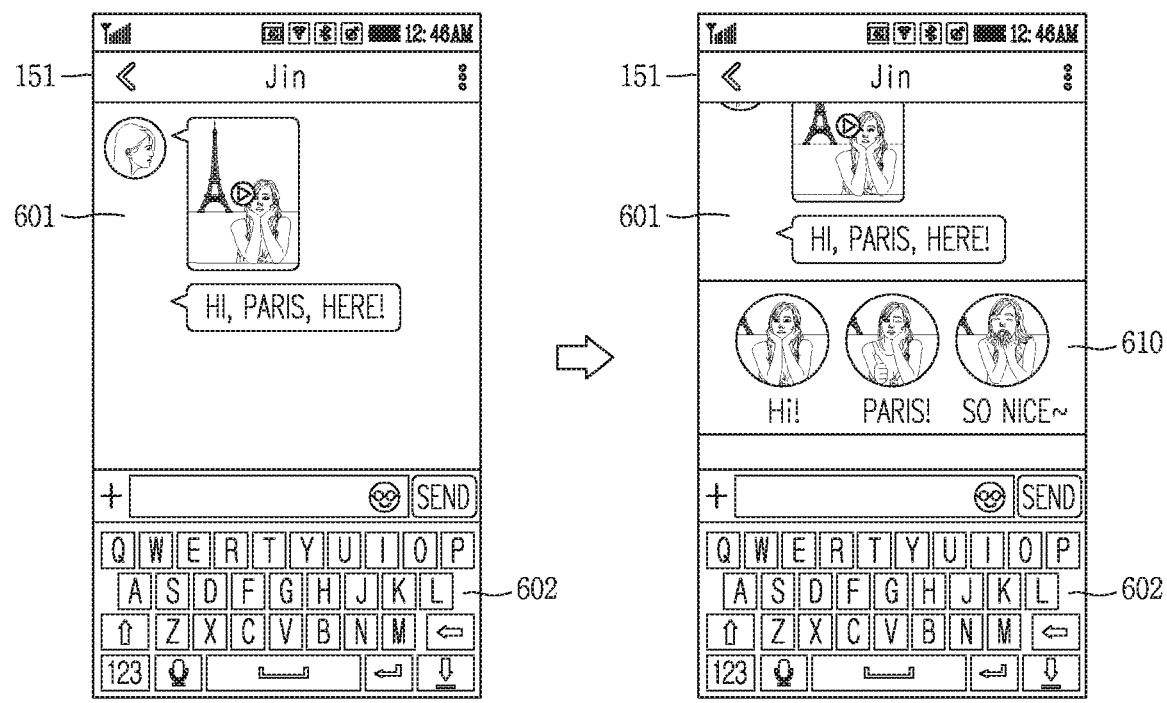

FIGS. 4, 5, and 6 are conceptual diagrams illustrating various examples of a method for displaying a created GIF image using a still image or moving picture displayed on a current conversation screen in the mobile terminal according to the exemplary embodiment.

As an exemplary embodiment, FIG. 4 illustrates an example in which a created GIF image is displayed using a touch input to the display unit 151.

Referring to FIG. 4, in a state in which one picture image 410 is shared on a message-based screen 401, if a message 420 (e.g., 'pretty') of a content delivering a feeling of the other party with respect to the shared picture image 410 is received from a terminal of the other party, a graphic object notifying that a text representing an emotional state has been detected may be displayed on the received message 420*a*. Here, the graphic object, for example, may be represented as a line in the form of an underline, which is drawn under the text representing the emotional state in the message 420 as shown in FIG. 4. However, the present disclosure is not limited thereto, and the graphic object may include any type of graphic image that is visually distinguished from other messages including no emotional state.

If a touch input is applied to the message 420*a* under which the line is drawn, the displayed picture image 410 is immediately changed to a moving GIF image 411 representing the detected emotional state. For example, the animation GIF image 411 in which twinkling starlight moves around a facial area may be provided in the picture image 410 (no need to input a transmission command).

In this case, while the touch input is being applied to a message area 420*b*, an image different from the previous image may be displayed in the corresponding message area 420*b*. Here, the image different from the previous image may mean that at least one of the size, shape, color, and highlighting effect of the corresponding message area is changed.

Meanwhile, if the touch input applied to the corresponding message area 420*b* is released, the controller 180 may allow the displayed GIF image 411 to be returned to the original picture image 410. That is, the controller 180 may operate to display the GIF image only while the touch input is being applied to the message area.

Alternatively, if the touch input is released after the created GIF image is reproduced while the touch input is being applied to the message area, the controller 180 may operate to provide only a specific still image (e.g., a scene displayed at the point of time when the touch input is released) from the GIF image.

In addition, if the voice setting of the mobile terminal 100 is set to a 'voice sound,' the controller 180 may output a voice sound (e.g., a voice sound corresponding to the emotional state represented in the GIF image) matched to the GIF image at the point of time when the touch input is applied to the message area. In this case, excitement together with a maximized emotional expression can be further provided to the user.

As another exemplary embodiment, FIG. 5 illustrates an example in which, when a plurality of persons transmit messages that deliver different feelings with respect to one image, a GIF image is displayed on a message-based screen.

First, as shown in FIG. 5, in a state in which a group chatting room screen 501 in which a plurality of persons participate, when a specific image is shared, and a feeling (She's pretty, isn't she?) with respect to a picture image 511 is included in a first message 520 received from s first speaker, a moving first GIF image 511 representing the feeling may be immediately applied to the corresponding picture image.

After that, when a second message 530 including another feeling (She's looks angry, isn't she?) with respect to the shared picture image is received from a second speaker, the first GIF image 511 may be immediately changed to a second GIF image representing the feeling included in the second message.

In this case, the controller 180 may remember a feeling with respect to a picture image matched for each message. Further, the controller 180 may remember a feeling with respect to a picture image matched for each speaker who speaks a message. That is, the controller 180 may connect a speaker, a message, and an analyzed emotional state as one group and remember the connected group.

Therefore, as shown in FIG. 5, when a third message 521 is received from the first speaker after the second message 530 is received, the controller 180 may change a current image (e.g., the second GIF image 512) to the first GIF image 511 related to the first speaker even though a feeling with respect to the shared picture image is not included in the third message. After that, even when a fourth message 531 is again received from the second speaker, the controller 180 may automatically change the current image 511 to the second GIF image 512 related to the second speaker.

Accordingly, even when a plurality of persons rapidly perform conversations in a group chatting room, a feeling or emotion of a current speaker with respect to a shared image (e.g., a vote result, a specific article, a specific blog, etc.) can be intuitively connected without searching previous conversation contents.

Meanwhile, when a speaker proposes another feeling or newly delivers a feeling with respect to another image, and a GIF image corresponding to the feeling is provided, the controller 180 may perform an update such that a GIF image is displayed by associating a recently created GIF image with the speaker.

In FIG. 5, when a shared picture image is scrolled together with transmitted and received messages, the controller 180 may allow a speaker to be no longer associated with a speaker.

As another embodiment, FIG. 6 illustrates an example in which, when a moving picture is shared on a message-based screen, a GIF image is displayed based on the shared moving picture.

When a moving picture is shared using a message-based screen 601, conversation participants can identify the content of the moving picture only when they download the moving picture and then reproduce the moving picture. Accordingly, in the embodiment shown in FIG. 6, a moving GIF image can be created based on a message related to the moving picture, without downloading the shared moving picture.

Specifically, the controller 180, based on a message (e.g., 'Hi!, Paris!, Great~') related to the shared moving picture, may extract a plurality of still images from the moving picture, and create a moving GIF image by connecting the plurality of extracted still images.

In this case, when a plurality of still images are extracted from the moving picture, the controller 180 may perform an operation on the basis of a message related to the moving picture. For example, the controller 180 may extract three still images respectively corresponding to 'Hi!,' 'Paris!,' and 'Great' from in 'Hi!, Paris!, Great~,' and then create a moving GIF image by sequentially connecting the extracted still images. Alternatively, the controller 180 may extract still images of a section in which a change in screen (or a change in gesture of a person/animal) from the moving picture, and then create a moving GIF image by connecting the extracted still images.

The GIF image created as described above may be displayed in another area 610 of the message-based screen 601, which is distinguished from the area of the moving picture. In this case, while the GIF image is being reproduced, a portion of the message may be output together with the GIF image, for example, in a typography form.

In addition, the controller 180 may differently adjust the reproduction speed of a GIF image displayed based on a message related to the moving picture. For example, if the tone or feeling of the message is bright and cheerful, the GIF image may be displayed at a reproduction speed faster than a reference value (e.g., 0.14 second or 10 FPS). If the tone or feeling of the message is dark and depressed, the GIF image may be displayed at a reproduction speed slower than the reference value (e.g., 0.14 second or 10 FPS).

According to the embodiment described above, without downloading and reproducing a shared moving picture, conversation participants can identify a summarized content of the moving picture using only a GIF image and then rapidly continue a conversation.

FIGS. 7, 8, 9, and 10 are conceptual diagrams illustrating various examples of a method for recommending a GIF image, using images shared on a conversation screen or images stored in the mobile terminal, in the mobile terminal according to the exemplary embodiment.

Figure 7:
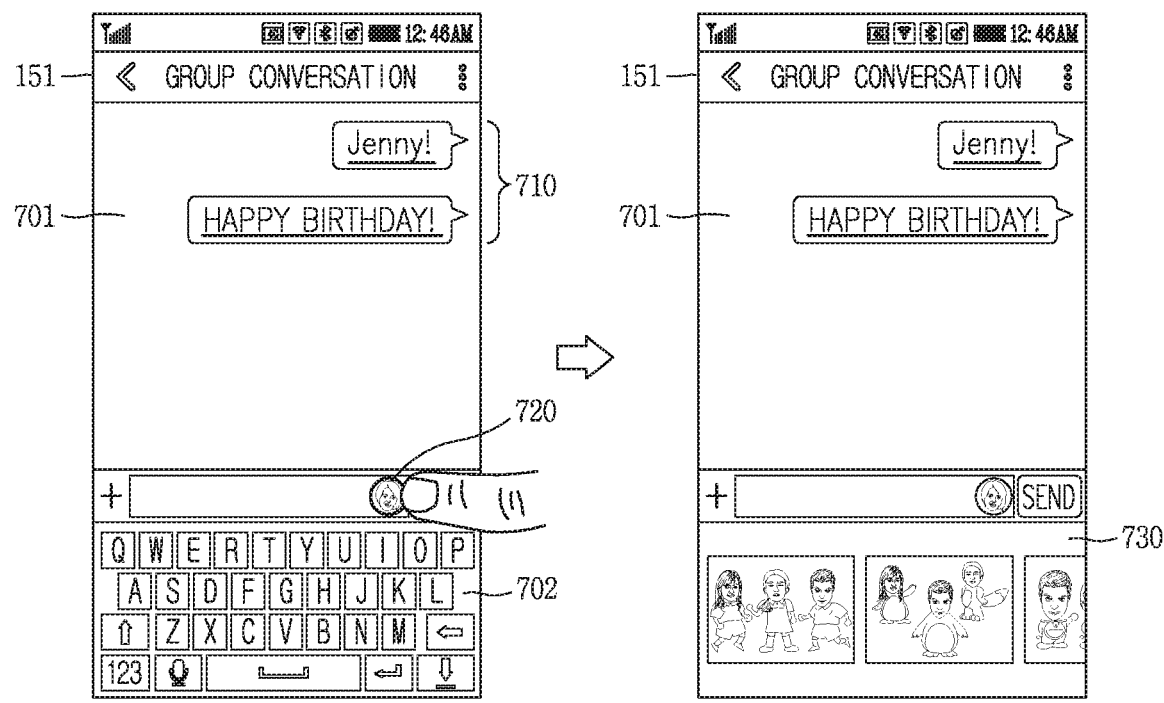
FIGS. 7, 8, 9, and 10 are conceptual diagrams illustrating various examples of a method for recommending a GIF image, using images shared on a conversation screen or images stored in the mobile terminal, in the mobile terminal according to the exemplary embodiment.

As an exemplary embodiment, FIG. 7 illustrates an example in which a related GIF is recommended based on a transmitted image. When a predetermined event element (e.g., a birthday congratulation, an anniversary congratulation, a new year congratulation, a promotion congratulation, a graduation congratulation, etc.) is detected from a message 710 ('transmitted message') displayed on a message-based screen 701, the controller 180 may display a function icon 720 for recommending a related GIF image in an input area for performing message creation.

Specifically, in FIG. 7, 'Jenny' and 'birthday' are detected as event elements from messages called 'Jenny' and 'Happy birthday,' the controller 180 may recognize 'Jenny' as the name of a person who attains the birthday in the detected event elements, and provide a function icon 720 related to the creation of a GIF image in a message input area, based on the recognized name. In this case, an address image of the terminal, searched based on the recognized name, or a profile image of the current conversation screen may be output as an image to the function icon 720.

Here, the function icon 720 becomes a menu for executing a function of recommending a GIF image related to the detected event element, e.g., a function of recommending one or more GIF images related to a birthday congratulation message.

If a touch input is applied to the function icon 720, one or more GIF images delivering congratulation messages, in which conversation participants of the current message-based screen are included, may be displayed in a keyboard area 702.

To this end, if a touch input is applied to the function icon 720, the controller 180 may detect a plurality of images that have been transmitted and received on the message-based screen, and extract facial areas of the conversation participants from the plurality of detected images. In the facial areas extracted as described above, a process of recognizing positions of eyes, noses, mouths, and the like, contours of faces, color information, and the like may be performed using a facial area extracting technique well-known in the art. A detailed description related to this will be omitted here. Next, the controller 180 may generate a plurality of GIF images by synthesizing facial areas of the conversation participants, which are extracted using the facial area extracting technique, on different background images. Here, the different background images may correspond to different moving card images. At this time, face insertion positions provided in the different background images may be different from one another. In this case, the controller 180 may insert the extracted facial areas to correspond to the respective face insertion portions provided in the different background images. In addition, the number of faces inserted into background images may be determined based on a smaller one of the number of the extracted facial areas and the maximum number of faces inserted into the background images.

If a touch input is applied to any one of the displayed GIF images, the corresponding GIF image is transmitted, so that all of the conversation participants can share the GIF image including a congratulation message.

Figure 8:
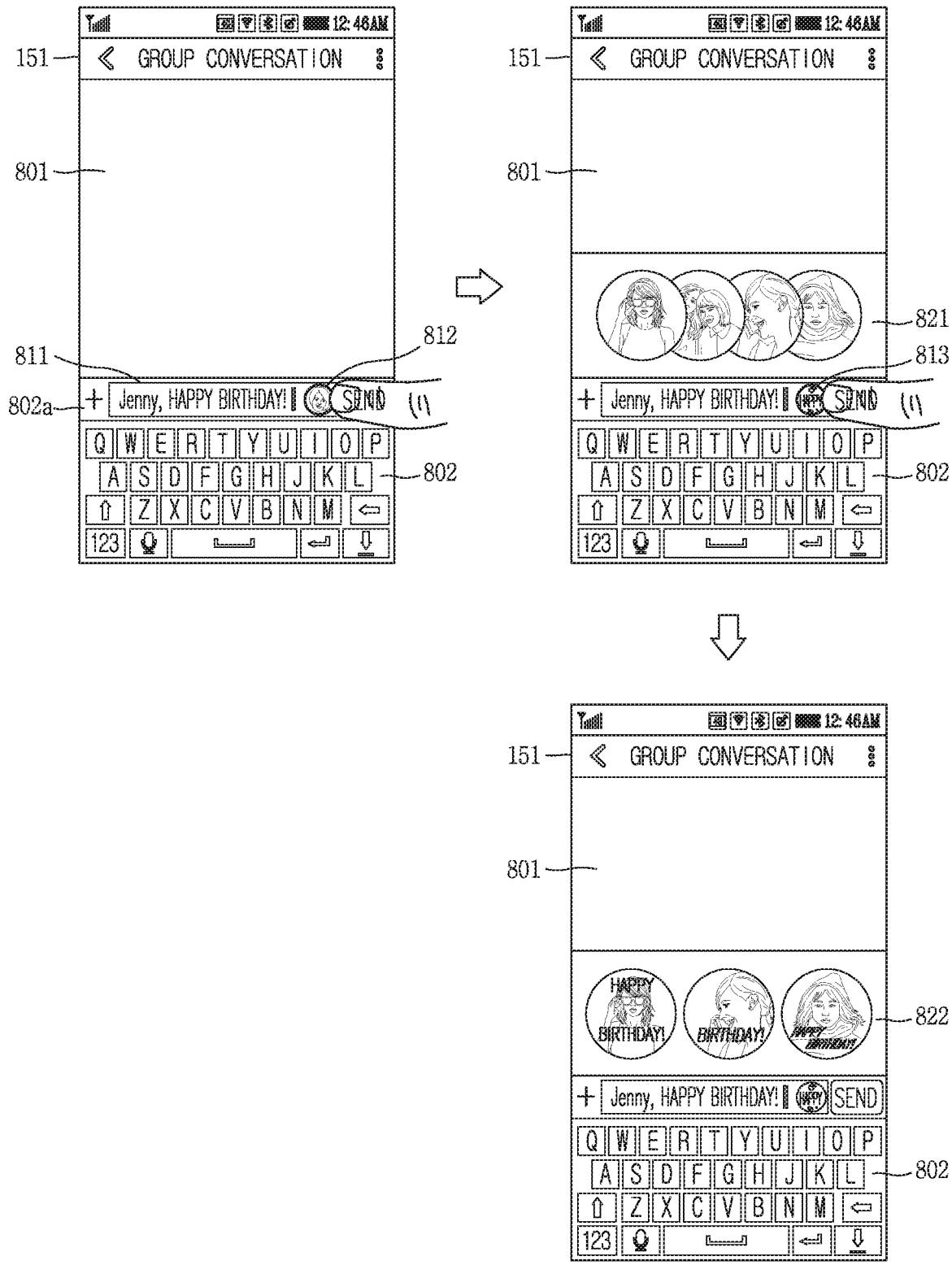

FIG. 8 illustrates an example in which a related GIF image is provided during message creation. In FIG. 8, while a message is being created using a virtual keyboard 802 on a conversation screen 801 of a group chatting room, a first function icon 812 for detecting shared images related to the message being created may be provided, for example, at a right side of a message input area 811.

If a touch input is applied to the first function icon 812, shared picture images 821 recognized as 'Jenny' may be provided in an area above the message input area 811 while the display of the virtual keyboard is being maintained. In addition, the first function icon 812 may be changed to a second function icon 813 for creating a GIF image delivering an event situation (e.g., a birthday) included in the message, i.e., a congratulation message.

In this case, if a subsequent touch input is applied to the second function icon 813, one or more GIF images 822 for delivering the congratulation message on the basis of the shared picture images 821 may be provided in the message input area. In this case, since the display of the virtual keyboard 802 is maintained, a user may simultaneously perform the selection of a GIF image and the creation of a message.

According to the embodiment described above, convenience can be provided to the user in that it is unnecessary to execute a separate application beyond a message screen so as to create or identify a GIF image related to an event. In addition, a moving card image is configured with faces of conversation participants, so that a more rich and meaningful congratulation message can be shared with the conversation participants.

Figure 9:
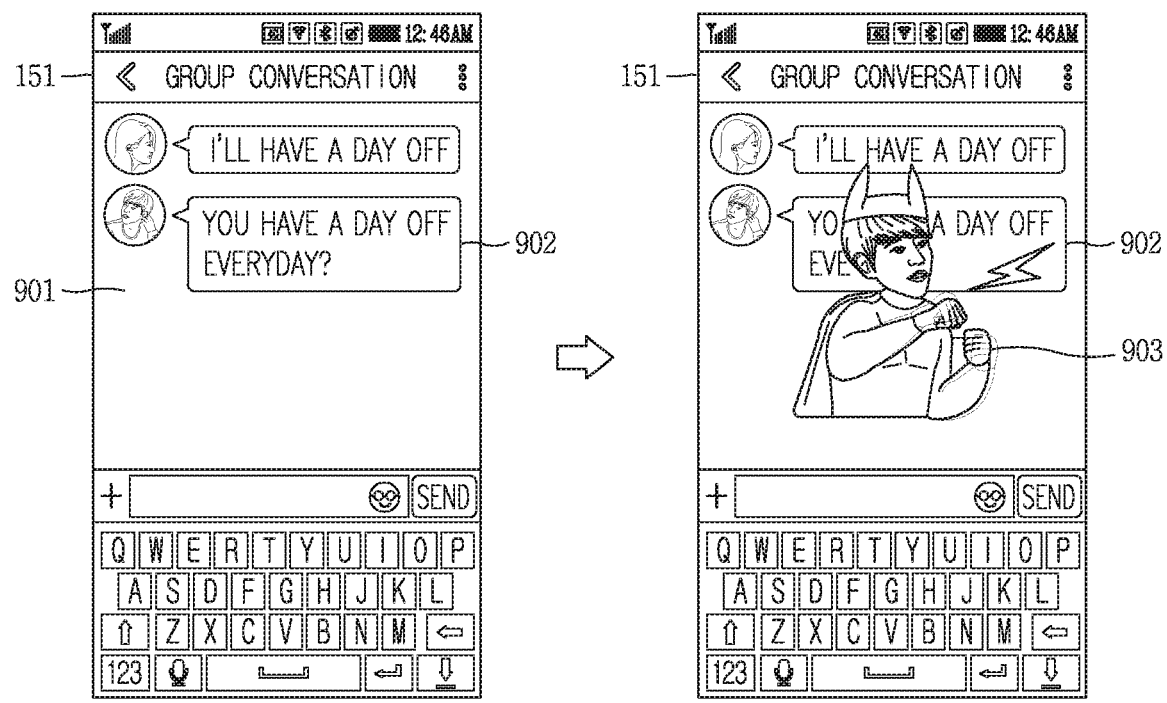

As another embodiment, FIG. 9 illustrates an example in which a GIF image is generated using an image that has been shared during a conversation or an image stored in the mobile terminal.

In FIG. 9, when an element representing an emotion upsurge state is included or presumed in a conversation context ('I'll have a day off, today,' 'You have a day off everyday, aren't you?') while a message-based conversation screen 901 is being displayed, the controller 180 may extract a face image of a speaker who transmits a corresponding message from picture images that have been shared on the conversation screen or an address book profile image.

The controller 180 may create a GIF image obtained by synthesizing the extracted face image on a background image representing the corresponding emotional state, and provide the created GIF image on the entire message-based conversation screen 901 (903). Therefore, at least a portion of a message area may be covered by the moving GIF image.

The GIF image displayed on the message-based conversation screen 901 may disappear when a preset time, e.g., three seconds elapses. In this case, before the preset time elapses, another GIF image may be displayed on the entire message-based conversation screen.

In addition, since a virtual keyboard area for creating a message is maintained even while the GIF image is being displayed on the entire message-based conversation screen, a user may input or transmit a new message even before the GIF image disappears.

As another exemplary embodiment, as shown in FIG. 10, when a message 1010 inquiring after health of a specific person is received on a message-based conversation screen 1001, the controller 180 may recognize, from the message, the name ('Tom') of the specific person to be inquired and a content ('Is he well grown?') to be inquired. Therefore, a function icon 1020 for creating a related GIF image may be displayed in a message input area.

At this time, if a touch input is applied to the function icon 1020, recent picture images of the recognized specific person to be inquired may be extracted from the memory 170 or downloaded from a cloud server linked with the mobile terminal 100 to be displayed in one area of the display unit 151, e.g., an area 1030 above the message input area. After that, if a touch is applied to a transmit key, a moving GIF image configured with the picture images displayed in the area 1030 may be created to be transmitted to a terminal of the other party. Accordingly, a GIF image showing recent events of Tom is automatically reproduced on the message-based conversation screen 1001 (1040*a* and 1040*b*).

Figure 11:
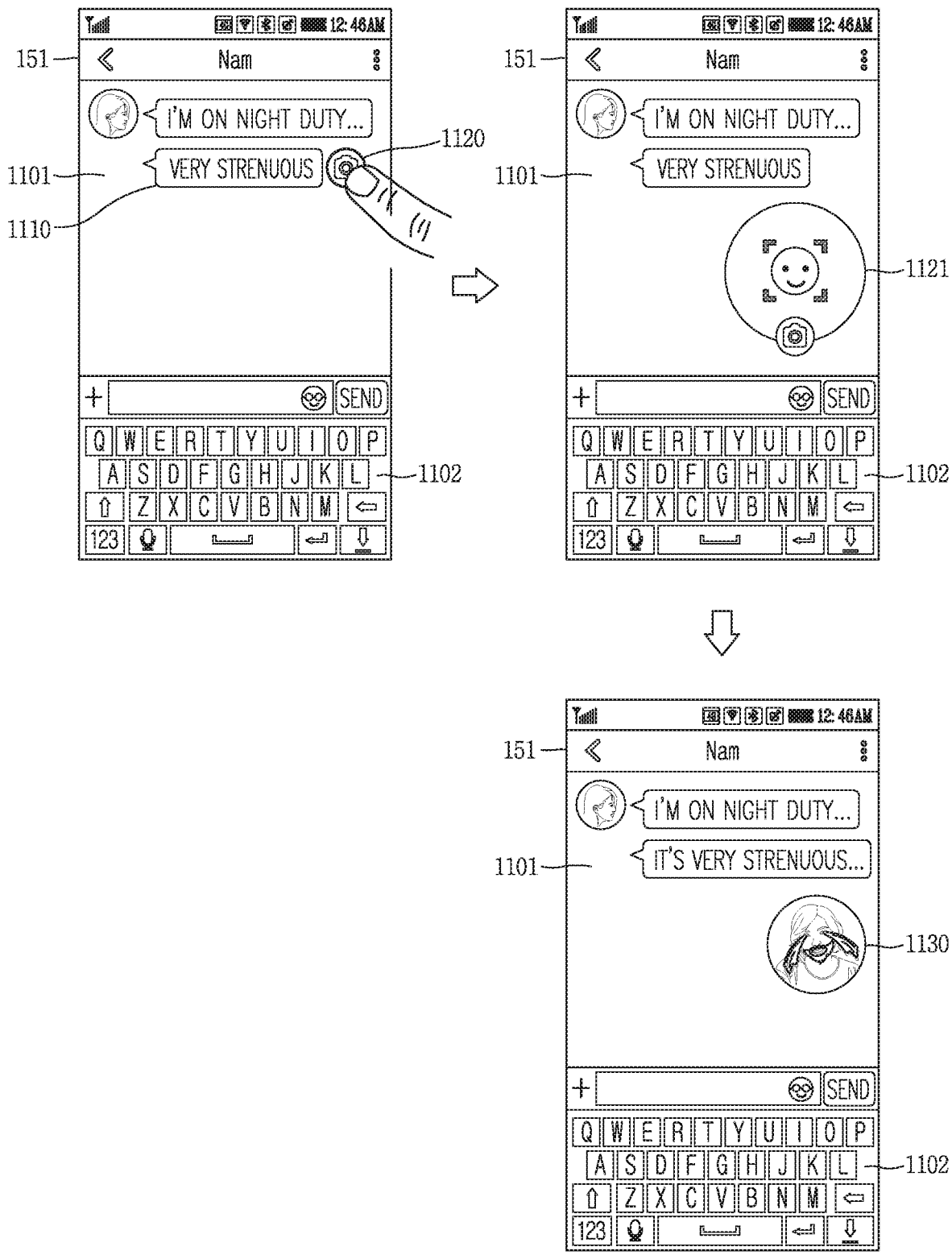
FIGS. 11 and 12 illustrate examples in which a GIF image is created using a moving picture photographing function in the mobile terminal according to the exemplary embodiment.
Figure 12:
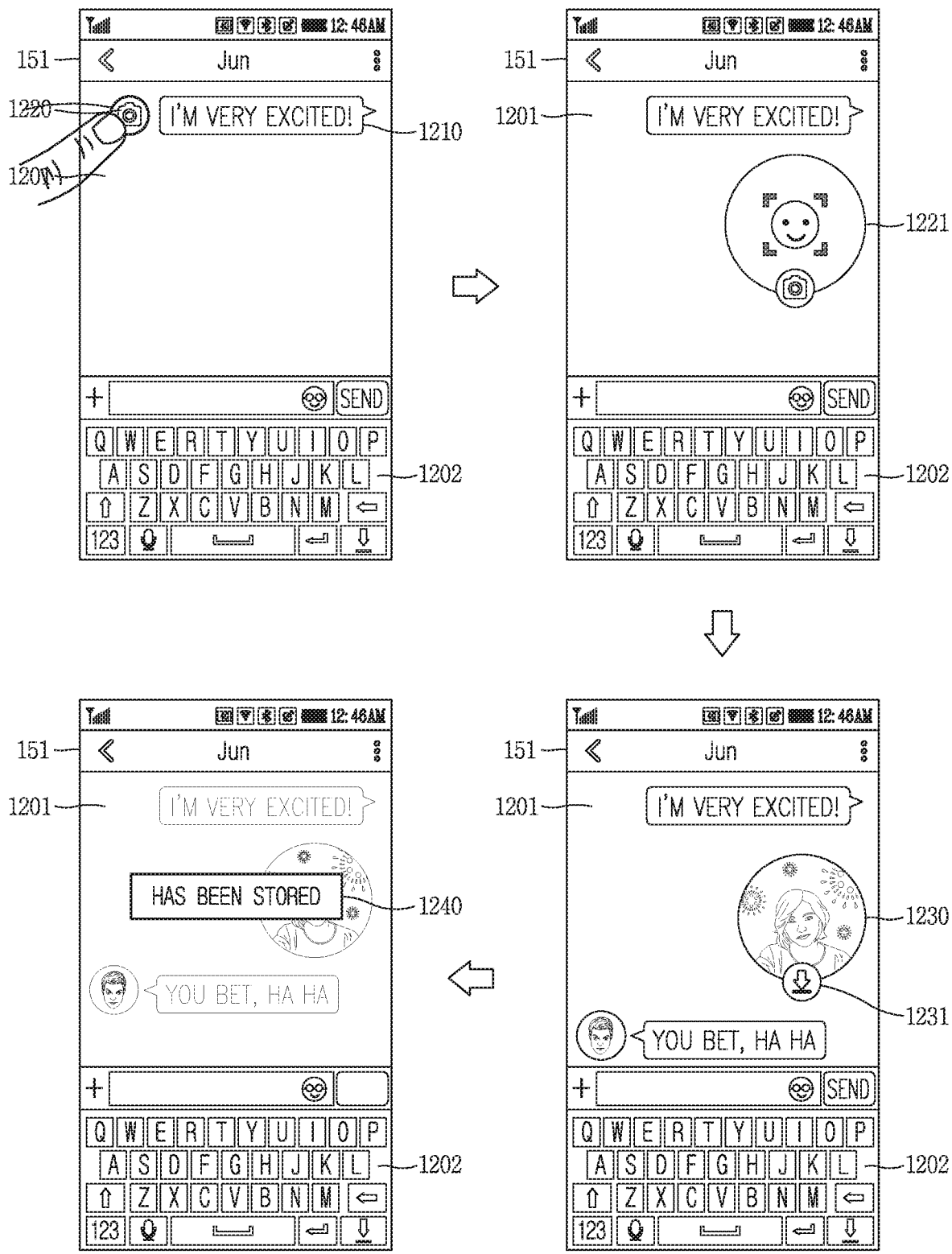

Hereinafter, FIGS. 11 and 12 illustrate examples in which a GIF image is created using a moving picture photographing function in the mobile terminal according to the exemplary embodiment.

First, referring to FIG. 11, when a message-based conversation screen 1101 is displayed on the display unit 151, and a message 1110 including an element (e.g., a text) representing an emotional state is received from a terminal of the other party, a moving picture photographing icon 1120 related to the generation of a GIF image may be provided in one area of the conversation screen 1101, e.g., at a position corresponding to the area in which the corresponding message 1110 is output (e.g., a right side of the area in which the received message is output).

Next, if a touch input is applied to the moving picture photographing icon 1120, a preview image 1121 for performing a moving picture photographing function a moving picture is provided in an area in which a transmitted message is displayed (e.g., at a right side of the conversation screen). At this time, the moving picture photographing function is distinguished from a typical moving picture photographing function in that the camera is executed in a state in which an expression of a corresponding emotion is set. To this end, the corresponding moving picture photographing function may operate to support expressions of various emotions (e.g., happiness, joy, pleasure, excitement, anger, fatigue, fear, irritation, depression, sadness, and the like). In this case, the expressions of various emotions may be represented by changing at least one of eyes, a nose, a mouth, and a contour in a user's face or by synthesizing other additional elements, e.g., a tear, glasses, a mustache, and the like.

In addition, guide information notifying that a face is recognized may be output to the preview image 1121. If the user's face is located in a guide box of the preview image 1121 in response ton the output guide information, moving picture photographing is started. While the moving picture photographing is being performed, a facial image to which the expression of the corresponding emotion is applied may be displayed on the preview image.

The moving picture photographing may be automatically ended, for example, after 3 to 5 seconds (a setting is changeable), and re-photographing may be performed sing a photographing button provided together with the preview image 1121. If the moving picture photographing is ended, the controller 180 may create a moving GIF image representing the corresponding emotional state, i.e., 'it's very strenuous,' based on the photographed moving picture.

To this end, a program for transforming a moving picture file format to a GIF file format may be previously installed in the mobile terminal 100, and the corresponding program may be continuously executed on a background while the message-based conversation screen is being executed on a foreground. The corresponding program may also support a function of automatically selecting start and end times of the photographed moving picture, a size of an image, and a reproduction speed.

If the moving GIF image is created as described above, the GIF image is displayed in a preview form. At this time, if the user touches a transmit button, the corresponding GIF image is transmitted to the terminal of the other party to be shared on the message-based conversation screen 1101. As described above, an immediate and maximized sympathy with respect to an emotion (e.g., 'It's very strenuous') of the other party can be expressed through the shared GIF image 1130.

In an exemplary embodiment, when a GIF image based on moving picture photographing is shared as a 'response' to an emotional expression of the other party, the controller 180 may operate to execute the camera in a state in which an emotional expression of a response matched to the corresponding emotional expression is set. For example, in FIG. 11, when the other party expresses an emotion called 'It's very strenuous,' the camera may be executed in a state in which a crying expression or encouraging expression is set as an emotional expression of a response matched to the corresponding emotional expression.

In an exemplary embodiment, the above-described GIF image based on moving picture photographing may be restricted to be displayed on only a message-based conversation screen that satisfies a predetermined condition. Here, the predetermined condition may include an element related to intimacy between conversation participants. Here, the element related to the intimacy may include, for example, elements such as the number of times of conversations with the other party per day, a group belonging to an address book, the number of chatting rooms to which the conversation participants belong, the number of shared images, the number of emoticon conversations, and a time of the last conversation. The GIF image based on moving picture photographing may be restricted to be created only when an intimacy level is equal to or greater than a reference value (or reference level). For example, the GIF image based on moving picture photographing may be created only when a message-based conversation is performed with a family or close friend.

In addition, the controller 180 may select different types of background images according to intimacy levels, and provide one GIF image configured with the selected background images. For example, in FIG. 11, if a touch input is applied to the moving picture photographing icon 1120, the camera may be executed in a state in which an expression permissible degree (e.g., a caricature degree) is differently set with respect to the same emotional expression according to intimacy levels with the other party.

FIG. 12 illustrates an example of a method for creating a GIF image based on moving picture photographing so as to maximize an emotion included in a transmitted message.

In FIG. 12, a moving picture photographing icon 1220 may be created at a left side of a transmission message area on a message-based conversation screen 1201 in response that a text representing an emotional expression is included in a transmitted message 1210.

If a touch input is applied to the moving picture photographing icon 1220, the camera is executed in a state in which an expression of a detected emotion (e.g., 'I'm very excited') is set. If moving picture photographing in which the expression of the corresponding emotion is set sing a preview image 1221 is ended, a GIF image 1230 on which an excited facial expression is displayed may be shared with conversation participants by automatically formatting the format of the photographed moving picture to a GIF file format. In this case, the GIF image 1230 may be provided in a shape corresponding to that of the preview image, e.g., a circular shape, and a capture/download icon 1231 may be provided at a lower end of the GIF image.

If a touch input is applied to the capture/download icon 1231 while the GIF image 1230 is being displayed, the controller 180 may output, on the display unit 151, an indicator 1240 notifying that the corresponding GIF image 1230 has been captured/downloaded. Accordingly, a person who performs moving picture photographing can immediately recognize that, for example, a conversation participant has captured/downloaded a corresponding GIF image in a group chatting room.

Figure 13:
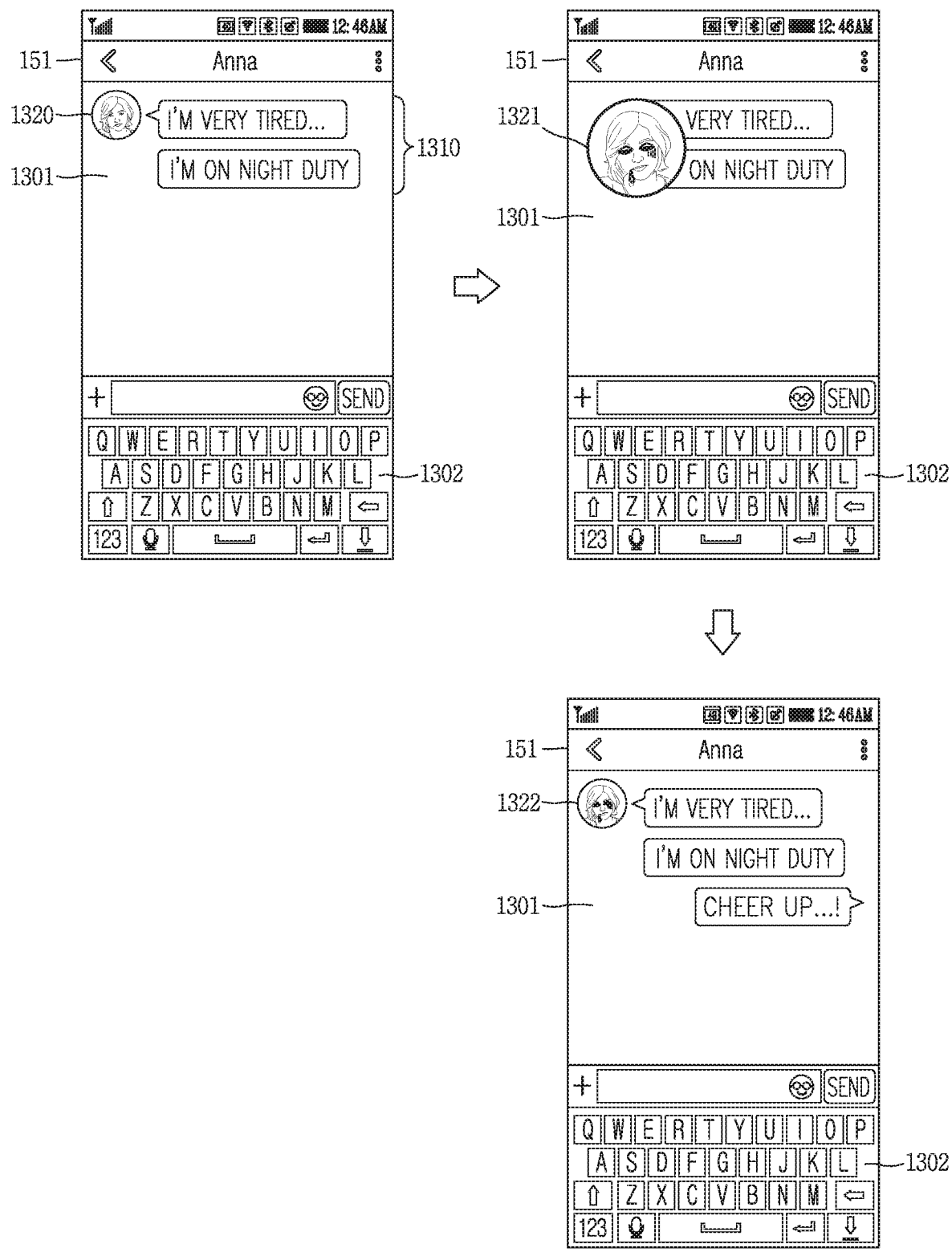
FIG. 13 illustrate an example in which a GIF image is created using a profile image of a conversation participant in the mobile terminal according to the exemplary embodiment.

Hereinafter, FIG. 13 illustrates an example in which a GIF image is created using a profile image of a conversation participant in the mobile terminal according to the exemplary embodiment.

In FIG. 13, when a message 1310 including a text (e.g., 'I'm very tired . . . ') representing an emotional state on a message-based conversation screen 1301 is received from a terminal of the other party, and there is no image transmitted to and received from the other party, a GIF image may be created based on a profile image of the other party. In this case, when a facial area is included in the profile image of the other party, a GIF image may be created by synthesizing a tired emotional expression on the corresponding facial image. On the other hand, when the facial area is not included in the profile image of the other party (e.g., a thing, nature, or the like), a predetermined GIF image having a specific expression emoticon may be used.

If the GIF image is created as described above, as a circular area in which the profile image is output is gradually enlarged as shown in FIG. 13, an image in which the expression of a tired emotion is maximized may be displayed to be gradually increased in the enlarged circular area (1321). In addition, if a reference time (e.g., 2 to 3 seconds) elapses, the GIF image may be continuously reproduced in the original circular area as the size of the enlarged circular area is decreased to the original size (1322). The profile image deformed as described above is applied to only a corresponding chatting room, and has no influence on other chatting rooms or profile images.

Meanwhile, in an exemplary embodiment, a function of creating a GIF image using a profile image may be applied to only a chatting room that satisfies a preset condition. Here, the preset condition may include an element related to intimacy with the other party. Here, the element related to the intimacy may include, for example, elements such as the number of times of conversations with the other party per day, a group belonging to an address book, the number of chatting rooms to which the conversation participants belong, the number of shared images, the number of emoticon conversations, and a time of the last conversation. The function of creating a GIF image using a profile image may be provided when an intimacy level is equal to or smaller than a reference value (or reference level).

For example, when there is no image that has been shared on the corresponding message-based conversation screen or when the number of times of emoticon conversations is equal to or smaller than a reference value (e.g., two times or less), a GIF image using a profile image may be provided. That is, when the intimacy with the other party is low, a GIF image may be created on the conversation screen using a profile image provided as a default.

In addition, the deformed profile image may be automatically returned to the original profile image when a preset time elapses or when the other party is out of the corresponding conversation screen.

Figure 14:
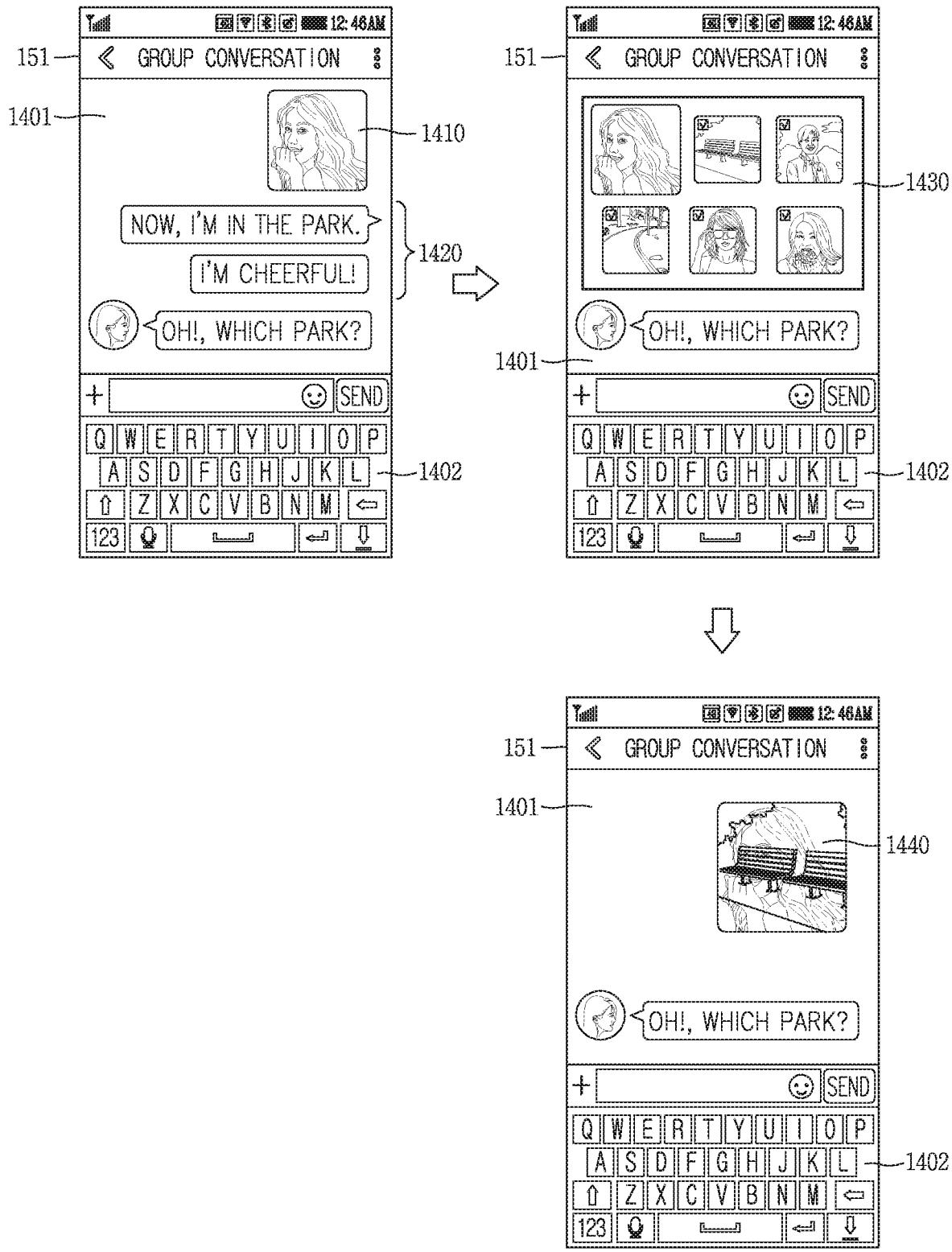
FIG. 14 illustrates an example of a method for providing a GIF image using images detected based on situation information included in a message, in the mobile terminal according to the exemplary embodiment.

Next, FIG. 14 illustrates an example of a method for providing a GIF image using images detected based on situation information included in a message, in the mobile terminal according to the exemplary embodiment.

Referring to FIG. 14, one or more situation information may be included in a transmitted (or received) message 1420 on a message-based conversation screen 1401. Here, the situation information is additional information related to a shared image, and may include objective information e.g., position information, time information, description information, or operation description information on a shared picture image 1410. In FIG. 14, the position information (e.g., 'park') on the picture image 1410 may be detected as the situation information.

Next, if a touch input is applied to the displayed picture image 1410, the controller 180 may control an operation to detect one or more images having the same situation information as the detected situation information from the memory 170 or to download one or more images having the same situation information as the detected situation information from a cloud server (not shown) linked with the mobile terminal 100. Accordingly, picture images of a user, which are photographed in the 'park,' are displayed in one area 1430 of the message-based conversation screen 1401. At this time, since the display of a keyboard area 1402 for inputting a message is maintained, message creation may be simultaneously performed while the controller 180 is creating a GIF image using a plurality of detected picture images.

As described above, in the present disclosure, a GIF image for delivering an emotional expression of a speaker during a conversation can be easily shared without executing a separate application, and a message-based conversation can be seamlessly continued while identifying the GIF image. In addition, while the message-based conversation is being performed, a more immediate emotion can be delivered, and fun and maximization of an emotional expression can be provided. Furthermore, since a GIF image suitable for a conversation situation is automatically provided to a user without directly searching or editing an image or moving picture to create a GIF image, the continuity of a conversation can be maintained, and convenience can be provided to the user.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal, comprising:
a main body;
a wireless communication unit mounted in the main body to transmit/receive a message;
a display unit configured to display the transmitted/received message on a message-based screen; and
a controller configured to:
cause the display unit to display an image shared among a plurality of participants on a group chatting room screen;
cause the display unit to display a first message received while the image is displayed, the first message including a first predefined content corresponding to a first comment about the displayed image;
create a first moving image associated with the first predefined content by applying a first moving animation image on the image displayed on the group chatting room screen in response to the first message;
cause the display unit to display the first moving image together with the first message on the group chatting room screen such that the first moving image is reproduced while the first message is being displayed on the group chatting room screen;
cause the display unit to display a second message received while the first moving image is displayed, the second message including a second predefined content corresponding to a second comment about the displayed image;
create a second moving image associated with the second predefined content by applying a second moving animation image on the image displayed on the group chatting room screen in response to the second message; and
cause the display unit to display the second moving image together with the second message on the group chatting room screen such that the second moving image is reproduced while the second message is displayed as a most recent message on the group chatting room screen.

2. The mobile terminal of claim 1, wherein the first moving image is synthesized from at least one moving object or moving animation image and the image displayed on the group chatting room screen, the at least one moving object or moving animation image representing an emotional state or feeling corresponding to the displayed image.

3. The mobile terminal of claim 1, wherein the first moving image is returned to the image previously displayed on the group chatting room screen after a preset time elapses.

4. The mobile terminal of claim 1, wherein the first moving image is provided while an input area for creating a message is being displayed on the group chatting room screen such that the first moving image is no longer displayed when the input area is not displayed.

5. The mobile terminal of claim 1, wherein the first moving image is replaced by the second moving image when the second moving image is displayed together with the second message.

6. The mobile terminal of claim 5, wherein the controller is further configured to cause the display unit to display the second moving image in a popup window form in a predetermined area of the group chatting room screen when the first moving image and the first message corresponding to the first moving image are scrolled as the second message is received.

7. The mobile terminal of claim 1, wherein the first message is also displayed on the group chatting room screen when the second moving image and the second message are displayed together on the group chatting room screen.

8. The mobile terminal of claim 1, wherein the plurality of participants include at least three participants.

9. The mobile terminal of claim 1, wherein the controller is further configured to:
cause the display unit to display a moving picture shared on the group chatting room screen, wherein the displayed first message is related to the moving picture;

extract a plurality of still images from the moving picture based on the displayed first message; and cause the display unit to display a moving image configured with the extracted still images.

10. The mobile terminal of claim 1, wherein the controller is further configured to:

cause the display unit to display a function icon for recommending a moving image related to an event element in response to detection of the event element from the displayed first message;

extract a facial area of a conversation participant from the image shared on the group chatting room screen; and recommend one or more moving images created based on the extracted facial area and the first message.

11. The mobile terminal of claim 1, wherein the second moving image, which is displayed on an entire area of the group chatting room screen, disappears from the group chatting room screen after a preset time elapses since the second moving image has been displayed.

12. The mobile terminal of claim 1, wherein the controller is further configured to:

cause the display unit to display a moving picture photographing icon related to creation of a moving image when an emotional state is detected from the displayed first message;

cause the display unit to display a preview image of moving picture photographing in one area of the group chatting room screen; and create the first moving image representing the corresponding first predefined content based on a moving picture photographed using the preview image.

13. The mobile terminal of claim 12, wherein the moving picture photographing icon is displayed when the group chatting room screen satisfies a predetermined condition, and wherein the predetermined condition includes an element related to intimacy between conversation participants.

14. The mobile terminal of claim 1, wherein the controller is further configured to:

execute capture or download of the first moving image while the first moving image is being displayed; and cause the display unit to display an indicator notifying that the first moving image has been captured or downloaded.

15. The mobile terminal of claim 1, wherein, when a facial area is included in a profile image displayed on the group chatting room screen, the first moving image is created based on the profile image of a person who transmits the first message.

16. The mobile terminal of claim 15, wherein the controller is further configured to create the first moving image based on the profile image of the person who transmits the first message when a preset condition is satisfied, and wherein the preset condition corresponds to a case where there is no image shared on the group chatting room screen.

17. The mobile terminal of claim 1, wherein the controller is further configured to:

detect situation information related to the image shared on the group chatting room screen from the displayed first message; and create the first moving image based on the image shared on the group chatting room screen and another image including the detected situation information in response to a touch input received at the shared image, following the detection of the situation information.

18. The mobile terminal of claim 1, further comprising a memory, wherein the controller is further configured to cause the memory to store:

a first group in which a first participant corresponding to the first message, the first message, and the first feeling are linked; and a second group in which a second participant corresponding to the second message, the second message, and the second feeling are linked.

19. The mobile terminal of claim 18, wherein the controller is further configured to cause the display unit to:

display a third message received while the second moving image is displayed, the third message corresponding to the first participant; and re-display the first moving image together with the third message on the group chatting room screen such that the first moving image is reproduced while the third message is displayed as a most recent message on the group chatting room screen.

20. The mobile terminal of claim 19, wherein the controller is further configured to cause the display unit to:

display a fourth message received while the first moving image is displayed in response to the third message, the fourth message corresponding to the second participant; and re-display the second moving image together with the fourth message on the group chatting room screen such that the second moving image is reproduced while the fourth message is being displayed as a most recent message on the group chatting room screen.

* * * * *